US008925848B2

(12) United States Patent
Niitsuma

(10) Patent No.: US 8,925,848 B2

(45) Date of Patent: Jan. 6, 2015

(54) DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 88 days.

(21) Appl. No.: 13/777,344

(22) Filed: Feb. 26, 2013

(65) Prior Publication Data

US 2013/0233957 A1 Sep. 12, 2013

(30) Foreign Application Priority Data

Mar. 12, 2012 (JP) ................................ 2012-054472

(51) Int. Cl.

*A01K 89/01* (2006.01)
*A01K 89/02* (2006.01)
*A01K 89/015* (2006.01)

(52) U.S. Cl.

CPC ............... *A01K 89/02* (2013.01); *A01K 89/015* (2013.01)

USPC .......................................... 242/314; 242/312

(58) Field of Classification Search

CPC .......................... A01K 89/015; A01K 89/033

USPC ......................................... 242/312, 314, 315

See application file for complete search history.

(56) References Cited

U.S. PATENT DOCUMENTS

| | | | |
|---|---|---|---|
| 5,120,002 A * | 6/1992 | Kawai | 242/314 |
| 5,370,331 A * | 12/1994 | Sato | 242/313 |
| 5,429,318 A * | 7/1995 | Sato | 242/314 |
| 5,558,290 A * | 9/1996 | Sato | 242/313 |
| 5,996,920 A * | 12/1999 | Yamaguchi | 242/286 |
| 6,095,444 A * | 8/2000 | Miyazaki | 242/312 |
| 6,152,389 A * | 11/2000 | Kim | 242/260 |
| 6,189,823 B1 * | 2/2001 | Kobayashi et al. | 242/312 |
| 6,206,312 B1 * | 3/2001 | Oh | 242/314 |
| 6,877,686 B2 * | 4/2005 | Datcuk, Jr. | 242/245 |
| 7,070,139 B2 * | 7/2006 | Nakagawa et al. | 242/313 |
| 2005/0011978 A1 * | 1/2005 | Datcuk, Jr. | 242/245 |

FOREIGN PATENT DOCUMENTS

JP 2570769 Y 5/1988

* cited by examiner

*Primary Examiner* — Emmanuel M Marcelo

(74) *Attorney, Agent, or Firm* — Global IP Counselors

(57) ABSTRACT

A dual-bearing reel includes a reel unit, a spool, a handle, a rotary member, and first and second rotary restricting units. The rotary member includes an engaging portion and is configured to be attachable to a first side plate when being rotated in an engagement direction for causing the engaging portion to be engaged to with the engaged portion. The rotary member is configured to be detachable from the first side plate when being rotated in a disengagement direction opposite to the engagement direction for causing the engaging portion to be disengaged from the engaged portion. The first rotary restricting unit is configured to restrict rotation of the rotary member in the engagement direction. The second rotary restricting unit is configured to restrict rotation of the rotary member in the disengagement direction while the first rotary restriction unit restricts rotation of the rotary member in the engagement direction.

10 Claims, 12 Drawing Sheets

1
5
8b 13b 8
12
17
8b
13b
13d
95a
102
95b
95
13b
8b
8c
8d
80
13
13c
101

DUAL-BEARING REEL

CROSS-REFERENCE TO RELATED APPLICATIONS

This application claims priority to Japanese Patent Application No. 2012-054472 filed on Mar. 12, 2012. The entire disclosure of Japanese Patent Application No. 2012-054472 is hereby incorporated herein by reference.

BACKGROUND

1. Field of the Invention

The present invention relates to a dual-bearing reel, particularly to a dual-bearing reel attached to a fishing rod in order to wind a fishing line.

2. Background Art

A dual-bearing reels generally includes a reel unit to be attached to a fishing rod, a spool disposed inside the reel unit, and a handle mounted to one side of the reel unit. The reel unit includes a frame and a pair of a first side cover and a second side cover for covering the both lateral sides of the frame. The frame includes a pair of a first side plate and a second side plate and a coupling member for coupling the first side plate and the second side plate. The first side cover is attached to the outside of the first side plate, while the second side cover is attached to the outside of the second side cover. The handle and a star drag are mounted laterally outwards of the second side cover. The first side cover, disposed on the opposite side of a handle attachment side, is attached to the second side plate while being allowed to be opened and closed for attaching/detaching the spool and a brake mechanism to/from the reel unit (see e.g., Japan Examined Utility Model Registration No. 2570769).

The first side cover of this type includes a ring-shaped cam body and an operating tool for operating the com body. When the cam body is rotated through a pivot operation of the operating tool, the cam body is engaged with or disengaged from an engaging piece protruding on the first side plate. Accordingly, the first side cover is configured to be attached to or detached from the first side plate.

SUMMARY

In the aforementioned well-known dual-bearing reel, the first side cover is configured to be attached to or detached from the first side plate through a pivot operation of the operating tool of the first side cover. However, it is possible that the first side cover (a rotary member) is unexpectedly detached from the first side plate by an angler's erroneous operation of the operating tool or an erroneous action of the operating tool.

It is an advantage of the present invention to prevent a rotary member from being unexpectedly detached from a first side plate in a dual-bearing reel.

A dual-bearing reel for winding a fishing line is provided. The dual-bearing reel is for being attached to a fishing rod. The dual-bearing reel includes a reel unit, a spool, a handle, a rotary member, and first and second rotary restricting units. The reel unit includes a first side plate being disposed on a first side and a second side plate being disposed on a second side opposition to the first side. The first side plate includes an opening formed in a lateral part thereof, and an engaged portion. The spool is configured to wind the fishing line. The spool is inserted into a space between the first side plate and the second side plate through the opening, and is rotatable with respect to the first side plate and the second side plate. The handle is configured to rotate the spool, and is disposed on the second side. The rotary member includes an engaging portion and is configured to be attachable to the first side plate when being rotated in an engagement direction for causing the engaging portion to be engaged to with the engaged portion. The rotary member is configured to be detachable from the first side plate when being rotated in an disengagement direction opposite to the engagement direction for causing the engaging portion to be disengaged from the engaged portion. The engaging portion protrudes from an outer peripheral part of the rotary member. The engaged portion is provided on a surrounding of the opening of the first side plate and protruding from the surrounding to an inner peripheral side. The first rotary restricting unit is configured to restrict rotation of the rotary member in the engagement direction. The second rotary restricting unit is configured to restrict rotation of the rotary member in the disengagement direction while the first rotary restriction unit restricts rotation of the rotary member in the engagement direction.

BRIEF DESCRIPTION OF THE DRAWINGS

Referring now to the attached drawings which form a part of this original disclosure.

DETAILED DESCRIPTION OF THE PREFERRED EMBODIMENTS

Structure of Reel

Figure 1:
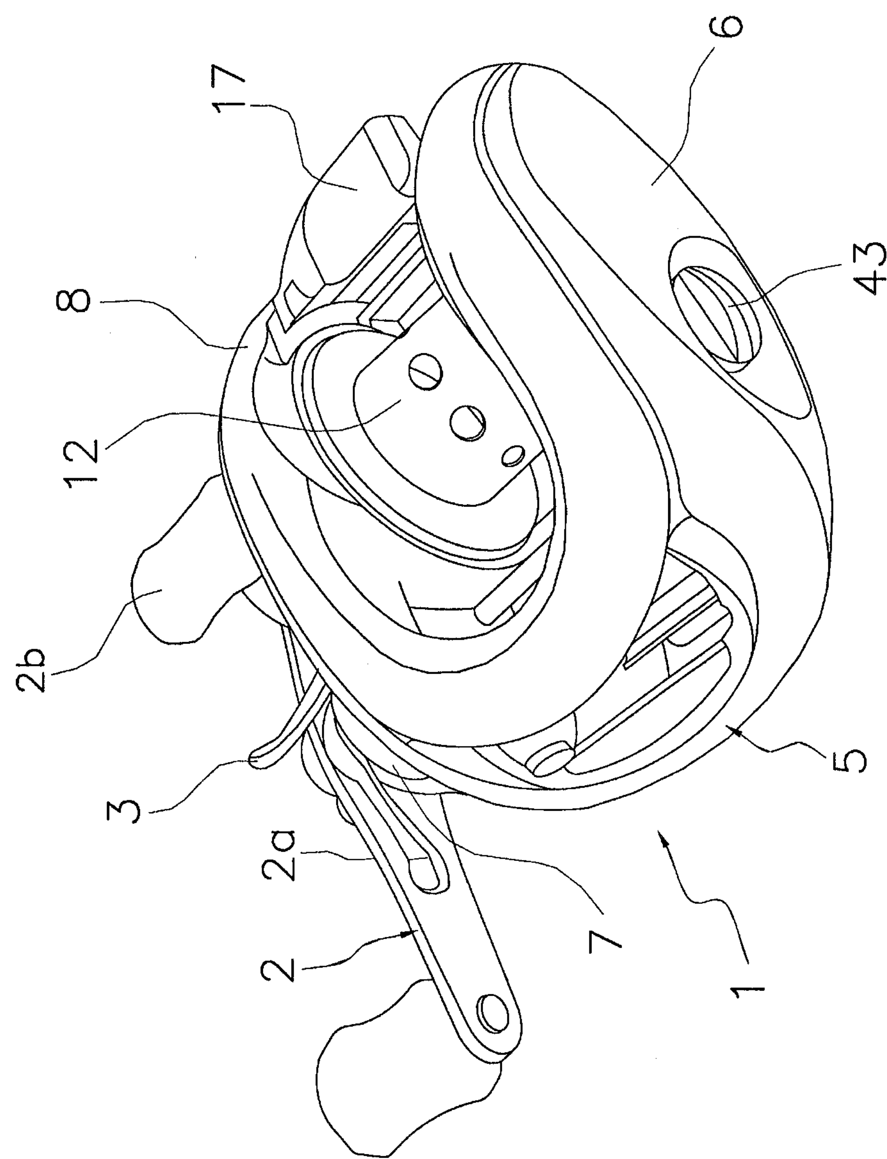
FIG. 1 is a perspective view of a dual-bearing reel employing an exemplary embodiment of the present invention.
Figure 2:
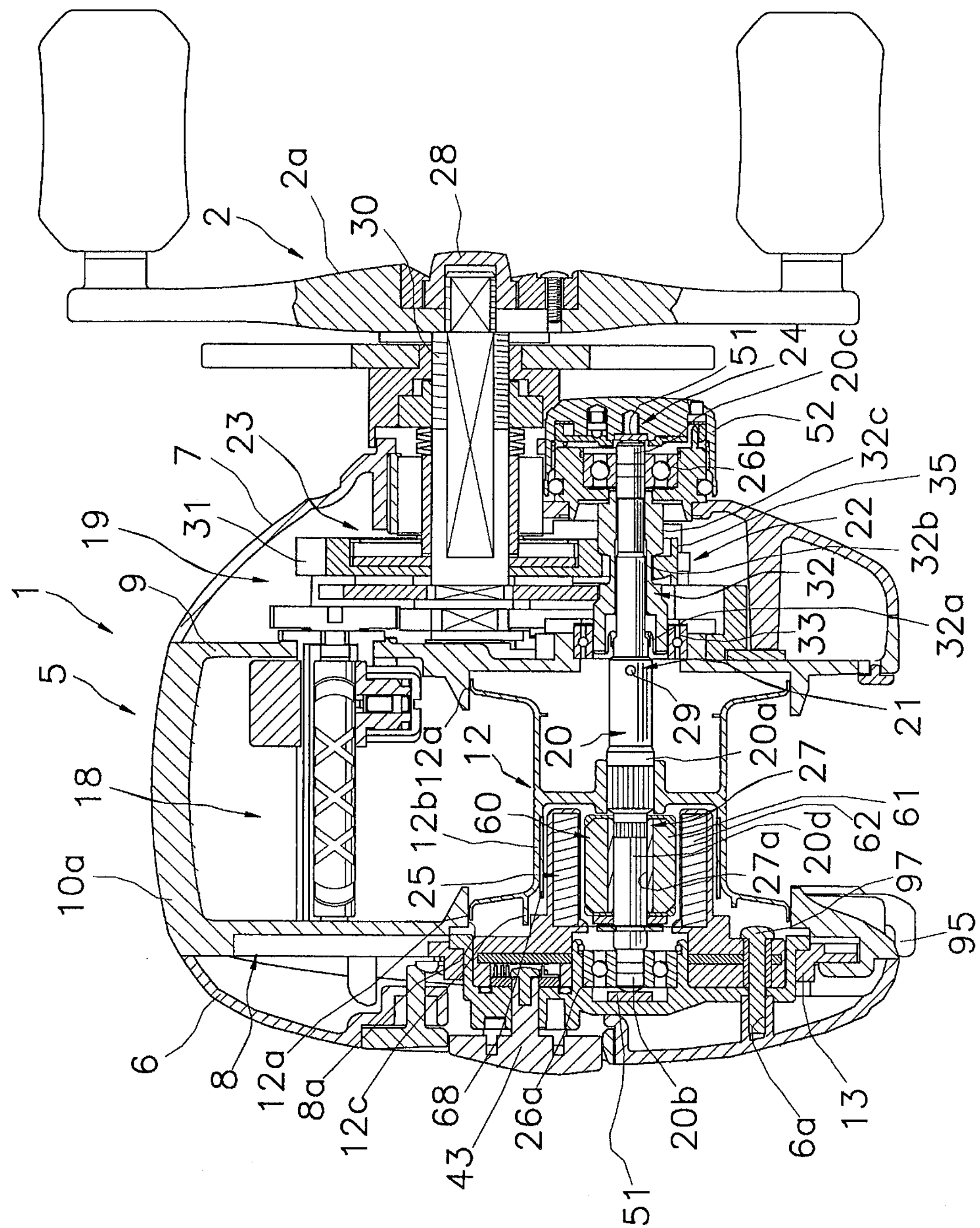
FIG. 2 is a cross-sectional view of the internal structure of a reel unit of the dual-bearing reel.

As illustrated in FIGS. 1 and 2, a dual-bearing reel according to an exemplary embodiment of the present invention is a low profile bait-casting reel. The reel includes a reel unit 1, a handle 2 for spool rotation, and a star drag 3 for drag regulation. The handle 2 is disposed laterally to the reel unit 1. The star drag 3 is disposed on a reel unit 1 side of the handle 2.

The handle 2 is of a double-handle type that includes an arm part 2*a* and knobs 2*b* rotatably attached to the both ends of the arm part 2*a*. As illustrated in FIG. 2, the arm part 2*a* is non-rotatably attached to the tip of a handle shaft 30 while being fastened to the handle shaft 30 by a nut 28.

The reel unit 1 is a member made of light metal such as magnesium alloy, for instance, and includes a frame 5, a first side cover 6, and a second side cover 7. The first and second side covers 6 and 7 are attached to the both lateral sides of the frame 5. A spool 12 for winding a fishing line is rotatably mounted to the inside of the reel unit 1 through a spool shaft 20 (see FIG. 2).

As illustrated in FIG. 2, the spool 12, a clutch lever 17 (see FIG. 1), and a lever winding mechanism 18 are disposed inside the frame 5. The clutch lever 17 functions as a thumb pad in thumbing the fishing line. The level winding mechanism 18 serves to uniformly wind the fishing line onto the spool 12. Further, a gear mechanism 19, a clutch mechanism 21, a clutch control mechanism 22, a drag mechanism 23, and a casting control mechanism 24 are disposed between the frame 5 and the second side cover 7. The gear mechanism 19 is configured to transmit rotational force from the handle 2 to the spool 12 and the level winding mechanism 18. The clutch mechanism 21 is configured to couple and decouple the spool 12 and the handle 2. The clutch control mechanism 22 is configured to control the clutch mechanism 21 in response to an operation of the clutch lever 17. The drag mechanism 23 is configured to brake the spool 12. The casting control mechanism 24 is configured to regulate resistive force to be applied when the spool 12 is rotated. On the other hand, a spool brake mechanism 25 is disposed between the frame 5 and the first side cover 6. The spool brake mechanism 25 is of an electric control type for inhibiting backlash in casting.

Figure 4:
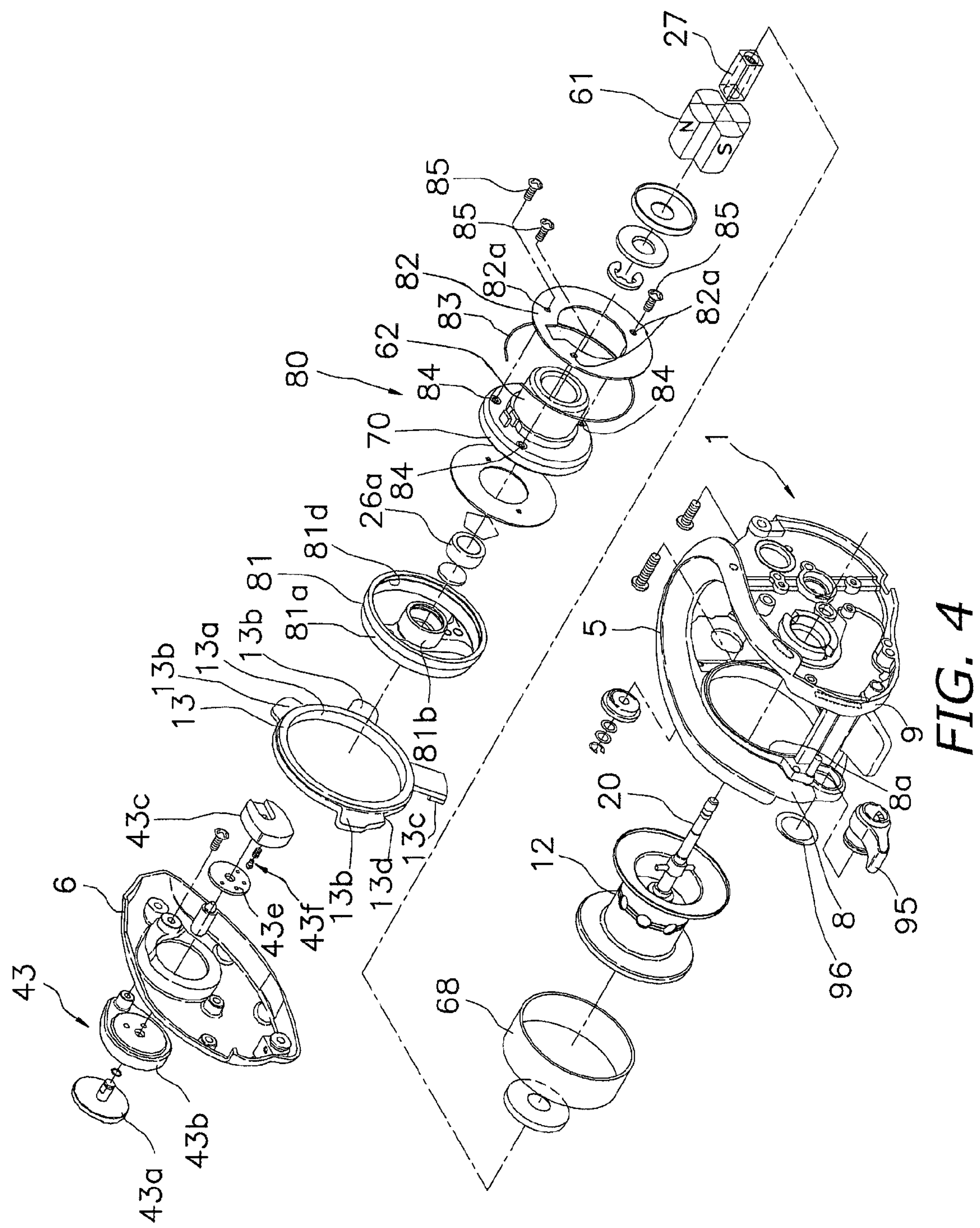
FIG. 4 is an exploded perspective view of the spool brake device.

As illustrated in FIGS. 2 and 4, the frame 5 has a pair of a first side plate 8 and a second side plate 9, and a plurality of coupling portions 10*a*. The first and second side plates 8 and 9 are disposed on opposite sides to each other at a predetermined interval. The coupling portions 10*a* integrally couple the first side plate 8 and the second side plate 9.

Figure 3:
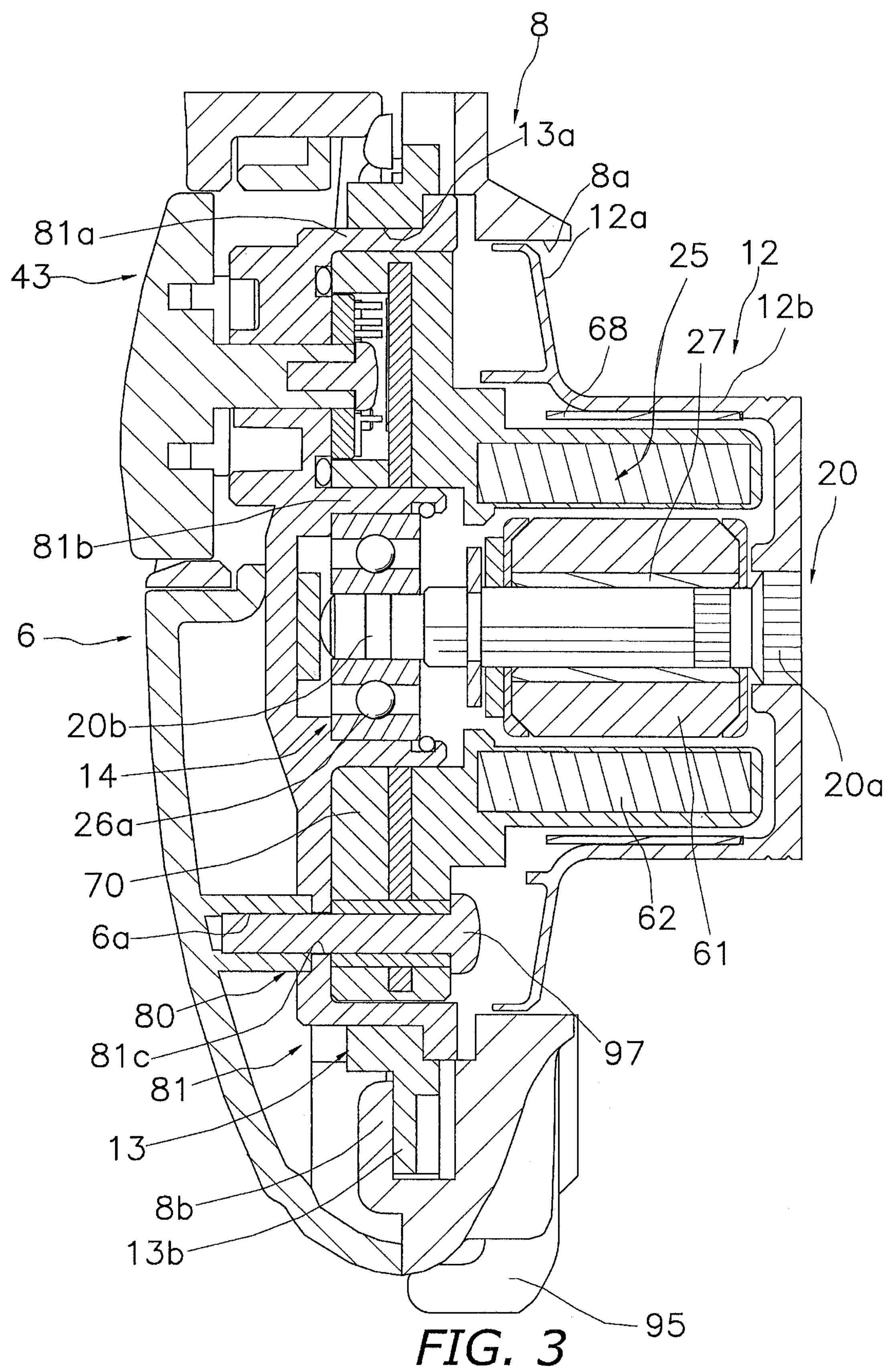
FIG. 3 is an enlarged cross-sectional view of a spool brake device of the dual-bearing reel.
Figure 7:
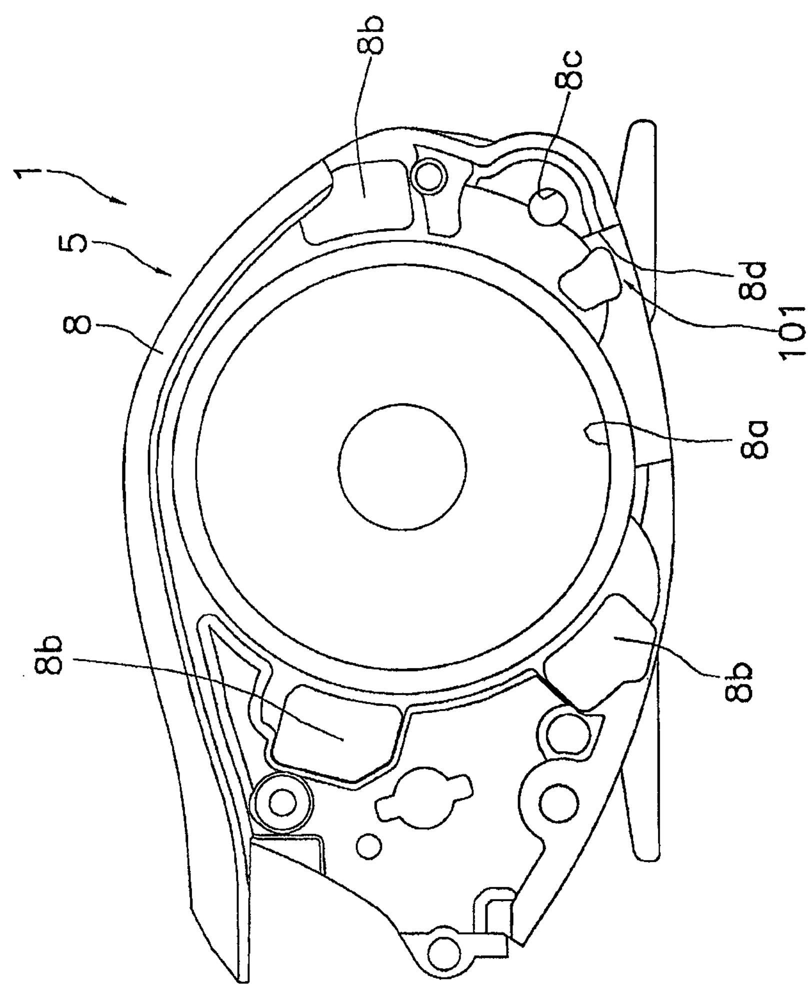
FIG. 7 is an enlarged side view of the reel unit.

As illustrated in FIGS. 3, 4 and 7, the first side plate 8 has an opening 8*a*, three engaged portions 8*b*, a through hole 8*c* (see FIG. 7), and a first protruding portion 8*d* (see FIG. 7). The opening 8*a* is circularly formed in the center part of the first side plate 8. The engaged portions 8*b* are formed in the surrounding of the opening 8*a* at predetermined intervals for detachably attaching annular member 13 (an exemplary rotary member of the present invention) to the first side plate 8. The through hole 8*c* is formed in a rear lower part of the first side plate 8 for supporting a lever member 95 in a pivotable state. The lever member 95 has a fourth protruding portion 95*b* (see FIG. 8) forming a part of a second rotary restricting unit 102. The second rotary restricting unit 102 is configured to restrict the annular member 13 from rotating in a disengagement direction. The first protruding portion 8*d* is protruding from the first side plate 8 while being disposed slightly below the through hole 8*c* formed in the rear lower part of the first side plate 8. The first protruding portion 8*d* forms a part of a first rotary restricting unit 101. The first rotary restricting unit 101 is configured to restrict the annular member 13 from rotating in an engagement direction.

As illustrated in FIG. 7, the engaged portions 8*b* are three plate-shaped members formed by partially protruding the surrounding part of the opening 8*a* of the first side plate 8 and further extending the end surface of the partially protruding part to the inner peripheral side. The engaged portions 8*b* are integrally molded with the first side plate 8. The first side plate 8 has a clearance between the surrounding of the opening 8*a* and the engaged portions 8*b*. Engaging portions 13*b* (to be described) of the annular member 13 are designed to be inserted with the clearance in a counterclockwise direction seen from the first side cover 6. The three engaged portions 8*b* are formed in the surrounding of the opening 8*a* of the first side plate 8 at predetermined intervals. Specifically, two of the three engaged portions 8*b* are formed in a front part of the surrounding of the opening 8*a* of the first side plate 8, while the remaining one of the three engaged portions 8*b* is formed in the rear part of the surrounding of the opening 8*a* of the first side plate 8.

As illustrated in FIG. 7, the through hole 8*c* circularly penetrates through the rear lower part of the first side plate 8 while supporting a tubular portion 95*c* to be described (see FIG. 8) of the lever member 95. The through hole 8*c* is disposed in the vicinity of a position below the engaged portion 8*b* formed in the rear part of the surrounding of the opening 8*a* of the first side plate 8.

As illustrated in FIG. 7, the first protruding portion 8*d* is protruding from the rear lower part of the first side plate 8 while being disposed slightly below the through hole 8*c*. The first protruding portion 8*d* serves to restrict the annular member 13 from rotating in the engagement direction while making contact with a second protruding portion 13*c* (to be described) of the annular member 13. The first protruding portion 8*d* is a bottom end portion of a protrusion formed along the contour of the rear lower part of the first side plate 8. The bottom end portion has a wall surface that the second protruding portion 13*c* is contactable therewith. It should be noted that the first protruding portion 8*d* forms a part of the first rotary restricting unit 101 configured to restrict the annular member 13 from rotating in the engagement direction.

Figure 6:
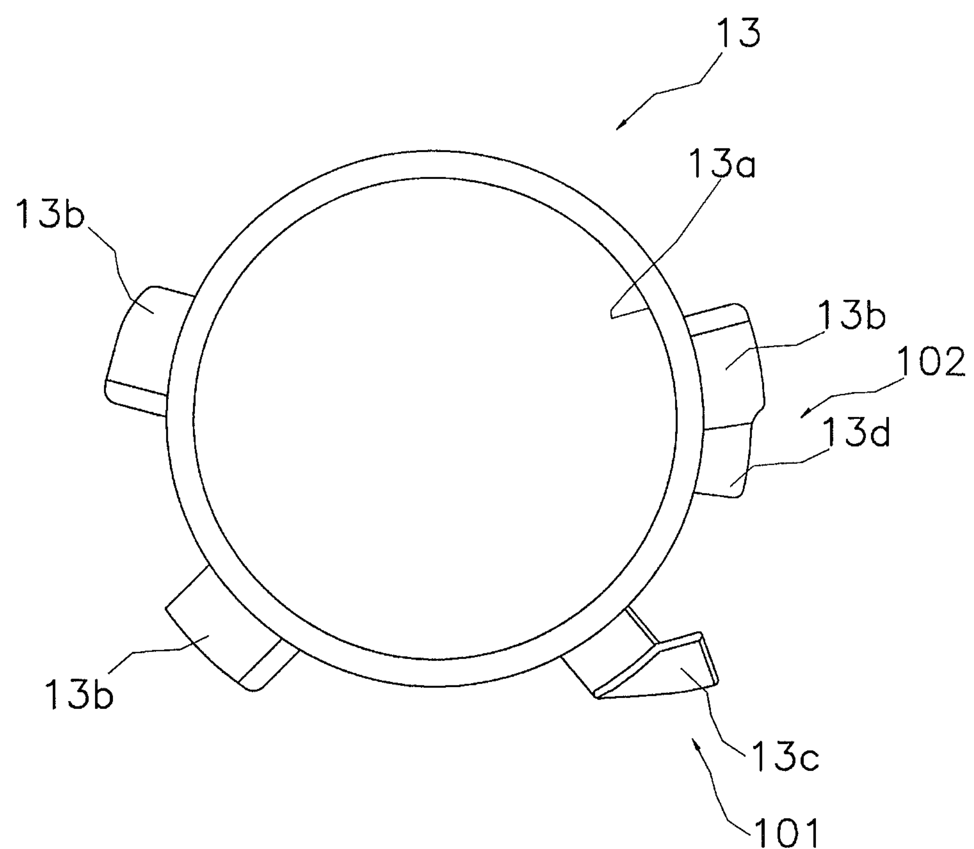
FIG. 6 is an enlarged front view of an annular member to be attached to a first side cover.

As illustrated in FIGS. 3, 4 and 6, the annular member 13 is a ring-shaped member formed by die casting of aluminum alloy and has an anodic oxide layer formed on the surface thereof by anodizing. A support member 81 to be described is attached to the inner peripheral part of the annular member 13, while a bearing accommodating part 14 is formed on the inner peripheral side of the support member 81. The bearing accommodating part 14 accommodates a bearing 26*a* that supports an end of the spool 12.

As illustrated in FIG. 6, the annular member 13 has an opening 13*a*, three engaging portions 13*b*, the second protruding portion 13*c*, and a third protruding portion 13*d*. The opening 13*a* is circularly formed as the inner peripheral part of the annular member 13. The engaging portions 13*b* are protruding radially outwards while being disposed on the outer peripheral part of the annular member 13 at predetermined intervals. The engaging portions 13*b* are respectively engaged with the engaged portions 8*b* of the first side plate 8. The second protruding portion 13*c* is protruding radially outwards from the outer peripheral part of the annular member 13 while being disposed between the front lower side engaging portion 13*b* and the rear side engaging portion 13*b*. The second protruding portion 13*c* is configured to make contact with the first protruding portion 8*d* of the first side plate 8. The second protruding portion 13*c* forms a part of the first rotary restricting unit 101 configured to restrict rotation of the annular member 13 in the engagement direction. The third protruding portion 13*d* is formed continuously to the second protruding portion 13*c* of the rear side engaging portion 13*b*. The third protruding portion 13*d* is configured to make contact with the fourth protruding portion 95*b*, which is described (see FIG. 8) hereinafter, of the lever member 95. The third protruding portion 13*d* forms a part of the second rotary restricting unit 102 configured to restrict rotation of the annular member 13 in the disengagement direction.

As illustrated in FIG. 6, the engaging portions 13*b* are protruding portions to be inserted with the clearance between the engaged portions 8*b* and the surrounding part of the opening 8*a* of the first side plate 8. The engaging portions 13*b* are configured to be inserted with the clearance in the counterclockwise direction seen from the first side cover 6. Each engaging portion 13*b* has a cam shape that the plate thickness of the engaging side end thereof is slightly reduced in the engagement direction. The three engaging portions 13*b* are formed on the outer peripheral part of the annular member 13 while being disposed at predetermined intervals. Specifically, two of the engaging portions 13*b* are formed on the front part of the annular member 13, while the remaining one of the engaging portions 13*b* is formed on the rear part of the annular member 13. The two engaging portions 13*b*, formed on the front part of the annular member 13, are respectively configured to be engaged with the two engaged portions 8*b* formed on the front part of the surrounding of the opening 8*a* of the first side plate 8. On the other hand, the remaining one of the engaging portions 13*b*, formed on the rear part of the annular member 13, is configured to be engaged with the engaged portion 8*b* formed on the rear part of the surrounding of the opening 8*a* of the first side plate 8. When the annular member 13 is herein rotated in either the engagement direction or the disengagement direction, the engaging portions 13*b*, which are formed on the outer peripheral part of the annular member 13 while being protruding thereof, are engaged with or disengaged from the engaged portions 8*b* which are formed about the opening 8*a* of the first side plate 8 while being protruding to the inner peripheral side. Accordingly, the annular member 13 is detachably attached to the first side plate 8.

As illustrated in FIG. 6, the second protruding portion 13*c* is protruding radially outwards from the outer peripheral part of the annular member 13 while being disposed between the front lower side engaging portion 13*b* and the rear side engaging portion 13*b*. The second protruding portion 13*c* is a protruding portion configured to make contact with the first protruding portion 8*d* of the first side plate 8 for restricting rotation of the annular member 13 in the engagement direction. The second protruding portion 13*c* is a portion protruding radially outwards from the outer peripheral part of the annular member 13. The tip thereof is slightly protruding axially outwards and is further protruding backwards therefrom. The backwardly protruding portion has a wall surface contactable with the first protruding portion 8*d* of the first side plate 8. It should be noted that the second protruding portion 13*c* forms a part of the first rotary restricting unit 101 configured to restrict rotation of the annular member 13 in the engagement direction.

As illustrated in FIG. 6, the third protruding portion 13*d* is formed continuously to the second protruding portion 13*c* side part of the rear side engaging portion 13*b*. The third protruding portion 13*d* is a protruding portion configured to make contact with the fourth protruding portion 95*b* (see FIG. 8) of the lever member 95 for restricting rotation of the annular member 13 in the disengagement direction. In other words, the third protruding portion 13*d* is a protruding portion disposed under and integrally molded with the rear side engaging portion 13*b*, while having a contour slightly smaller than that of the rear side engaging portion 13*b*. The annular member 13 is herein restricted from rotating in the disengagement direction under the condition that the bottom end of the third protruding portion 13*d* makes contact with the fourth protruding portion 95*b* of the lever member 95 and the annular member 13 is thereby restricted from rotating in the engagement direction. It should be noted that the third protruding portion 13*d* forms a part of the second rotary restricting unit 102 configured to restrict rotation of the annular member 13 in the disengagement direction.

Figure 8:
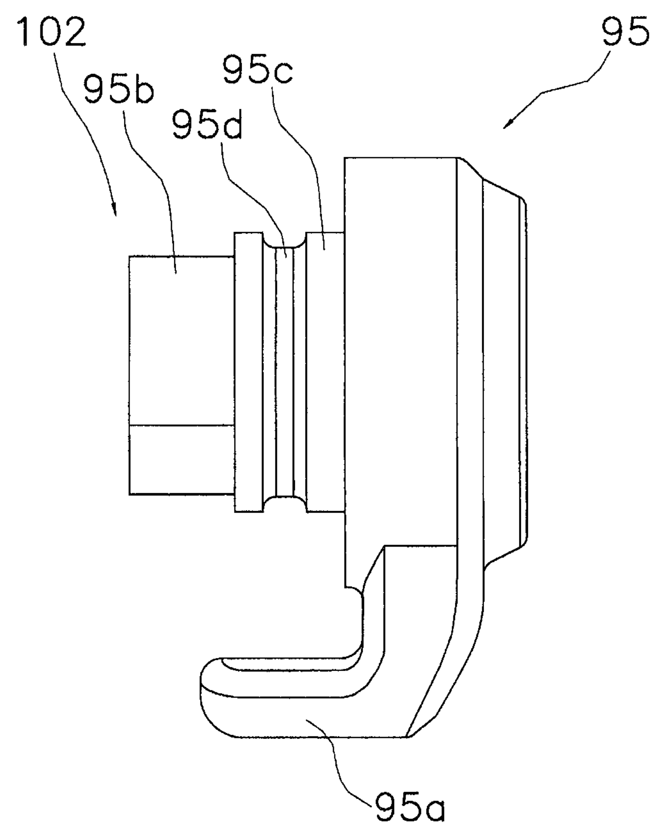
FIG. 8 is an enlarged front view of a lever member to be attached to the reel unit.

As illustrated in FIGS. 3, 4 and 8, the lever member 95 is disposed on the spool 12 side lateral portion of the rear bottom part of the first side plate 8. The lever member 95 is also attached to the surrounding part of the opening 8*a* of the first side plate 8, while being pivotable about an axis arranged in parallel to the spool shaft 20. The lever member 95 has an operating portion 95*a*, the fourth protruding portion 95*b* (see FIG. 8), the tubular portion 95*c* (see FIG. 8), and a grooved portion 95*d* (see FIG. 8). In conjunction with a pivot operation of the operating portion 95*a*, the fourth protruding portion 95*b* can be shifted back and forth between a restriction position and a restriction released position. The fourth protruding portion 95*b* is allowed to make contact with the third protruding portion 13*d* in the restriction position, whereas the fourth protruding portion 95*b* is prevented from making contact with the third protruding portion 13*d* in the restriction released position. The tubular portion 95*c* is pivotably supported by the through hole 8*c* of the first side plate 8. The grooved portion 95*d* is formed on the outer peripheral surface of the tip of the tubular portion 95*c*. The grooved portion 95*d* prevents the lever member 95 from being detached from the first side plate 8, while an O-ring 96 (see FIG. 4) is attached thereto.

As illustrated in FIG. 8, the operating portion 95*a* is formed on the bottom portion of a part that is formed on the base end of the tubular portion 95*c* and has a diameter greater than that of the tubular portion 95*c*. The operating portion 95*a* is protruding radially outwards therefrom and is further bent and protruding towards the tip end of the tubular portion 95*c*. The operating portion 95*a* is a knob that can be operated and pivoted up and down with being pinched by the fingers of an angler. In conjunction with an upward pivot operation of the operating portion 95*a*, the fourth protruding portion 95*b* makes contact with the bottom end of the third protruding portion 13*d*, and accordingly, rotation of the annular member 13 is restricted (see FIG. 9). In contrast, in conjunction with a downward pivot operation of the operating portion 95*a*, the fourth protruding portion 95*b* is released from making contact with the bottom end of the third protruding portion 13*d*, and accordingly, rotation of the annular member 13 is released from being restricted (see FIG. 10).

Figure 9:
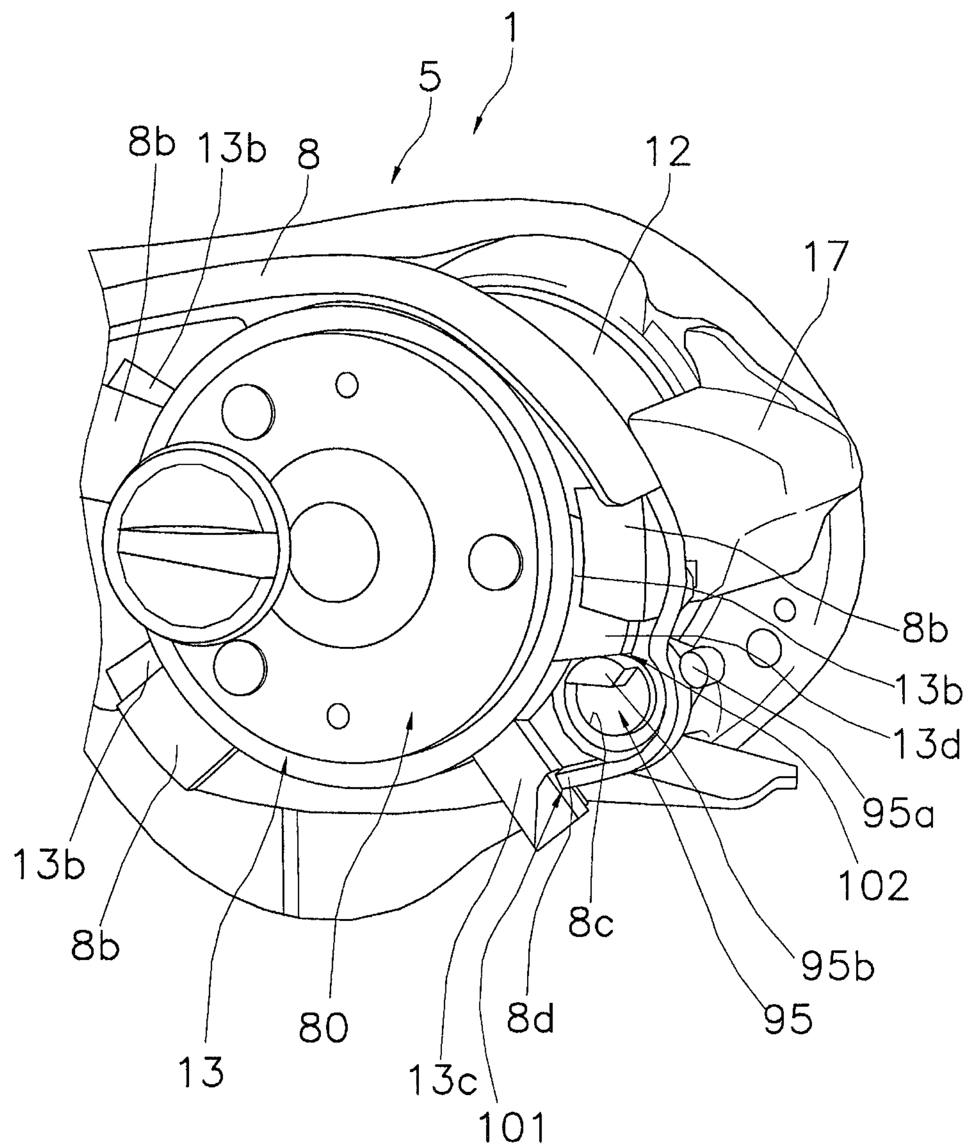
FIG. 9 is an enlarged perspective view of the dual-bearing reel where rotation of the annular member is restricted by an upward pivot operation of the lever member.
Figure 10:
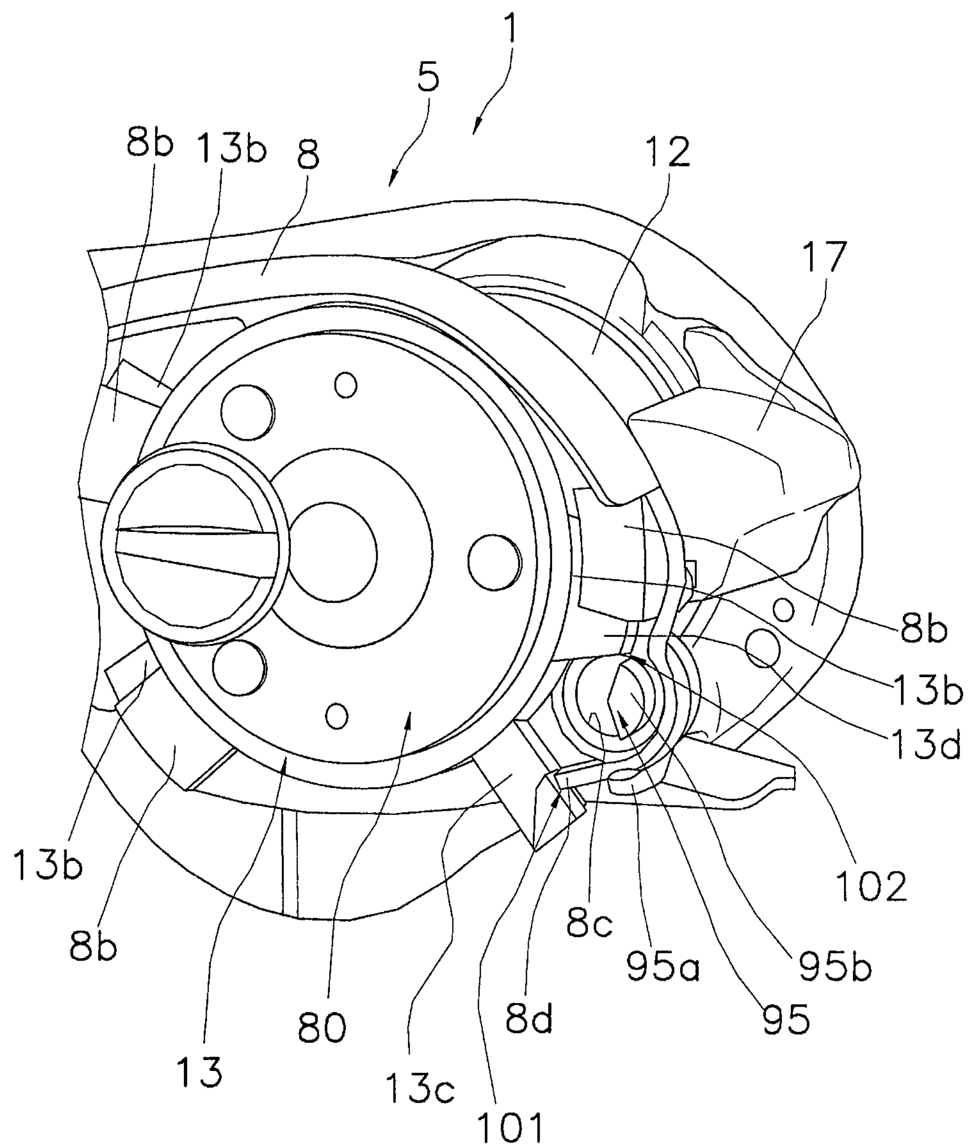
FIG. 10 is an enlarged perspective view of the dual-bearing reel where rotational of the annular member is free from restriction by a downward pivot operation of the lever member.

As illustrated in FIG. 8, the fourth protruding portion 95*b* is a protruding portion formed on and protruding from the upper part of the tip end of the tubular portion 95*c*. The fourth protruding portion 95*b* is allowed to be shifted between a restriction position and a restriction released position in conjunction with a pivot operation of the operating portion 95*a*. The fourth protruding portion 95*b* is allowed to make contact with the third protruding portion 13*d* in the restriction position, whereas the fourth protruding portion 95*b* is prevented from making contact with the third protruding portion 13*d* in the restriction released position. As illustrated in FIG. 9, the fourth protruding portion 95*b* makes contact with the bottom end of the third protruding portion 13*d* in conjunction with an upward pivot operation of the operating portion 95*a*, and accordingly, rotation of the annular member 13 is restricted. In contrast, as illustrated in FIG. 10, the fourth protruding portion 95*b* is located in a position where the fourth protruding portion 95*b* does not make contact with the bottom end of the third protruding portion 13*d* in conjunction with a downward pivot operation of the operating portion 95*a*, and accordingly, rotation of the annular member 13 is unreleased. It should be noted that the fourth protruding portion 95*b* forms a part of the second rotary restricting unit 102 configured to restrict rotation of the annular member 13 in the disengagement direction.

As illustrated in FIGS. 9 and 10, the first rotary restricting unit 101 is configured to restrict rotation of the annular member 13 in the engagement direction. The first rotary restricting unit 101 includes the first protruding portion 8*d* and the second protruding portion 13*c*. The first protruding portion 8*d* is formed by outwardly protruding a part of the surrounding of the opening 8*a* of the first side plate 8. The second protruding portion 13*c* is formed on and protruding from the outer peripheral part of the annular member 13. The second protruding portion 13*c* is configured to make contact with the first protruding portion 8*d* when the annular member 13 is rotated in the engagement direction. Accordingly, the second protruding portion 13*c* restricts rotation of the annular member 13 in the engagement direction.

As illustrated in FIGS. 9 and 10, the second rotary restricting unit 102 is configured to restrict rotation of the annular member 13 in the disengagement direction under the condition that the first rotary restricting unit 101 restricts the annular member 13 from rotating in the engagement direction. The second rotary restricting unit 102 includes the third protruding portion 13*d* and the fourth protruding portion 95*b*. The third protruding portion 13*d* is integrally molded with the rear side engaging portion 13*b* while being disposed under the rear side engaging portion 13*b*. The fourth protruding portion 95*b* is formed on and protruding from the upper part of the tip end of the tubular portion 95*c*. The fourth protruding portion 95*b* is configured to make contact with the third protruding portion 13*d* when the annular member 13 is rotated in the disengagement direction. Accordingly, the fourth protruding portion 95*b* restricts rotation of the annular member 13 in the disengagement direction.

Rotation of the annular member 13 is herein restricted in conjunction with the upward pivot operation of the lever member 95 (see FIG. 9). Contrarily, rotation of the annular member 13 is released from being restricted in conjunction with the downward pivot operation of the lever member 95 (see FIG. 10). It should be noted that the restriction direction of the lever member 95 is the same as the engagement direction of the annular member 13. In other words, the engagement direction of the annular member 13 (i.e., the counterclockwise direction seen from the first side cover 6) is the same as the restriction direction of the lever member 95 (i.e., the upward direction, which is the counterclockwise direction seen from the first side cover 6).

Next, a method of attaching/detaching the annular member 13 to/from the first side plate 8 will be explained in detail.

First, in attaching the annular member 13 to the first side plate 8, the annular member 13 is disposed about the opening 8*a* of the first side plate 8 and is then rotated in the engagement direction (i.e., the counterclockwise direction seen from the first side cover 6). Accordingly, the three engaging portions 13*b* of the annular member 13 are engaged with the three engaged portions 8*b* of the first side plate 8. Next, the annular member 13 is rotated in the engagement direction until the second protruding portion 13*c* of the annular member 13 makes contact with the first protruding portion 8*d* of the first side plate 8. Accordingly, the annular member 13 is restricted from rotating in the engagement direction. When the operating portion 95*a* of the lever member 95 is operated and pivoted in the restriction direction (i.e., the upward direction, which is the counterclockwise direction seen from the first side cover 6) while the annular member 13 is restricted from rotating in the engagement directional, the fourth protruding portion 95*b* of the lever member 95 makes contact with the third protruding portion 13*d* of the annular member 13 (see FIG. 9). Accordingly, the annular member 13 is restricted from rotating in the disengagement direction and the annular member 13 is fixed to the first side plate 8.

Contrarily, in detaching the annular member 13 from the first side plate 8, the operating portion 95*a* of the lever member 95 is operated and pivoted in the restriction release direction (i.e., the downward direction, which is the clockwise direction seen from the first side cover 6). The fourth protruding portion 95*b* of the lever member 95 becomes uncontactable to the third protruding portion 13*d* of the annular member 13 (see FIG. 10). Accordingly, rotational restriction of the annular member 13 is released. Under the condition, the annular member 13 is rotated in the disengagement direction (i.e., the clockwise direction seen from the first side cover 6). The three engaging portions 13*b* of the annular member 13 are thereby disengaged from the three engaged portions 8*b* of the first side plate 8. Accordingly, the annular member 13 can be detached from the first side plate 8.

As illustrated in FIG. 2, the spool 12 has a pair of flanges 12*a* and a bobbin trunk 12*b*. The flanges 12*a* are saucer-shaped portions formed on the both axial lateral sides of the spool 12. The bobbin trunk 12*b* is a tubular portion formed between the flanges 12*a*. The outer peripheral surface of the left-side flange 12*a* (see FIG. 2) is disposed on the inner peripheral side of the opening 8*a* at a slight clearance for preventing the fishing line from getting stuck therewith. The spool 12 is non-rotatably fixed to the spool shaft 20 penetrating the inner peripheral side of the bobbin trunk 12*b* by, for instance, serration coupling.

The spool shaft 20 is made of non-magnetic metal such as SUS304. The spool shaft 20 extends to the outside of the second side cover 7 while penetrating the second side plate 9. The extending end of the spool shaft 20 is rotatably supported by a boss attached to the second side cover 7 through a bearing 26*b*. On the other hand, the other end of the spool shaft 20 is rotatably supported by the bearing 26*a*. The spool shaft 20 has a large-diameter portion 20*a*, a small-diameter portion 20*b* and a small-diameter portion 20*c*. The large-diameter portion 20*a* is positioned in the axial center part of the spool shaft 20. The small-diameter portions 20*b* and 20*c* are formed on the both axial ends of the spool shaft 20. The small-diameter portion 20*b* is supported by the bearing 26*a*, while the small-diameter portion 20*c* is supported by the bearing 26*b*. It should be noted that the bearings 26*a* and 26*b* are roller bearings. Each of the bearings 26*a* and 26*b* includes a roller member, an inner race and an outer race. These members are made of SUS404, and their surfaces are reformed for enhancing corrosion resistance of the bearings 26*a* and 26*b*.

Further, the spool shaft 20 has a magnet attachment portion 20*d* between the large-diameter portion 20*a* and the left-side small-diameter portion 20*b* (see FIG. 2). The magnet attachment portion 20*d* has an outer diameter greater than that of the small-diameter portion 20*b* and less than that of the large-diameter portion 20*a*. Magnets 61 to be described are attached to the magnet attachment portion 20*d*. A magnet holding portion 27 is non-rotatably fixed to the magnet attachment portion 20*d* by, for instance, serration coupling. For example, the magnet holding portion 27 is made of magnetic material obtained by performing electroless nickel plating with respect to the surface of iron material such as SUM (extrusion and cutting). The magnet holding portion 27 is a quadratic prism member with a square cross-section. The magnet holding portion 27 has a through hole 27*a* in the center part thereof. The magnet attachment portion 20*d* penetrates the through hole 27*a*. The fixation method of the magnet holding portion 27 is not limited to serration coupling, and a variety of coupling methods (e.g., key coupling, splined coupling, etc.) can be used as the fixation method.

The right end of the large-diameter portion 20*a* of the spool shaft 20 is disposed in the through-hole part of the second side plate 9. An engaging pin 29, which forms a part of the clutch mechanism 21, is fixed to the right end of the large-diameter portion 20*a* of the spool shaft 20. The engaging pin 29 penetrates the large-diameter portion 20*a* along its diameter. The both axial ends of the engaging pin 29 are radially protruding from the large-diameter portion 20*a*.

As illustrated in FIG. 1, the clutch lever 17 is disposed behind the spool 12 while being disposed on the rear part of the space interposed between a pair of the first side plate 8 and the second side plate 9. The clutch lever 17 is coupled to the clutch control mechanism 22. The clutch lever 17 is configured to be slid up and down between the first side plate 8 and the second side plate 9 for switching the clutch mechanism 21 between a coupled state and a decoupled state.

The gear mechanism 19 includes the handle shaft 30, a drive gear 31, and a pinion gear 32. The drive gear 31 is fixed to the handle shaft 30. The pinion gear 32 is formed in a tubular shape and is meshed with the drive gear 31. The handle shaft 30 is rotatably attached to the second side plate 9 and the second side cover 7. The handle shaft 30 is prevented from rotating in the fishing-line releasing direction (i.e., reversing) by a roller-type one-way clutch and a pawl-type one-way clutch. The roller-type one-way clutch is attached radially between the second side cover 7 and the handle shaft 30. The drive gear 31 is rotatably attached onto the handle shaft 30, while being coupled to the handle shaft 30 through the drag mechanism 23.

The pinion gear 32 is a tubular member that the spool shaft 20 penetrates the center part thereof. The pinion gear 32 extends from the outside to the inside of the second side plate 9. The pinion gear 32 is attached onto the spool shaft 20 while being axially movable. Further, the left end of the pinion gear 32 (see FIG. 2) is supported by the second side plate 9 through a bearing 33 while being rotatable and axially movable. Further, the pinion gear 32 has an engaged groove 32*a* on the left end thereof (see FIG. 2). The engaged groove 32*a* is engaged with the engaging pin 29. The engaged groove 32*a* and the engaging pin 29 form the clutch mechanism 21. Further, the pinion gear 32 has a narrowed portion 32*b* in the axially intermediate part thereof. Yet further, the pinion gear 32 has a gear portion 32*c* on the right end thereof. The gear portion 32*c* is meshed with the drive gear 31.

The clutch control mechanism 22 includes a clutch yoke 35. The clutch yoke 35 is configured to be moved along the direction of the spool shaft 20. The clutch control mechanism 22 further includes a clutch return mechanism (not illustrated in the figures). The clutch return mechanism is configured to turn on the clutch mechanism 21 (i.e., a clutch-on state) in conjunction with rotation of the spool 12 in the fishing-line winding direction.

The casting control mechanism 24 includes a plurality of friction plates 51 and a brake cap 52. The friction plates 51 abut to the both ends of the spool shaft 20 from the axial outside of the spool shaft 20. The brake cap 52 is configured to regulate abutting pressure of the friction plates 51 against the spool shaft 20. The left-side friction plate 51 is attached to the inside of the bearing accommodating part 14.

Structure of Spool Brake Mechanism

Figure 5:
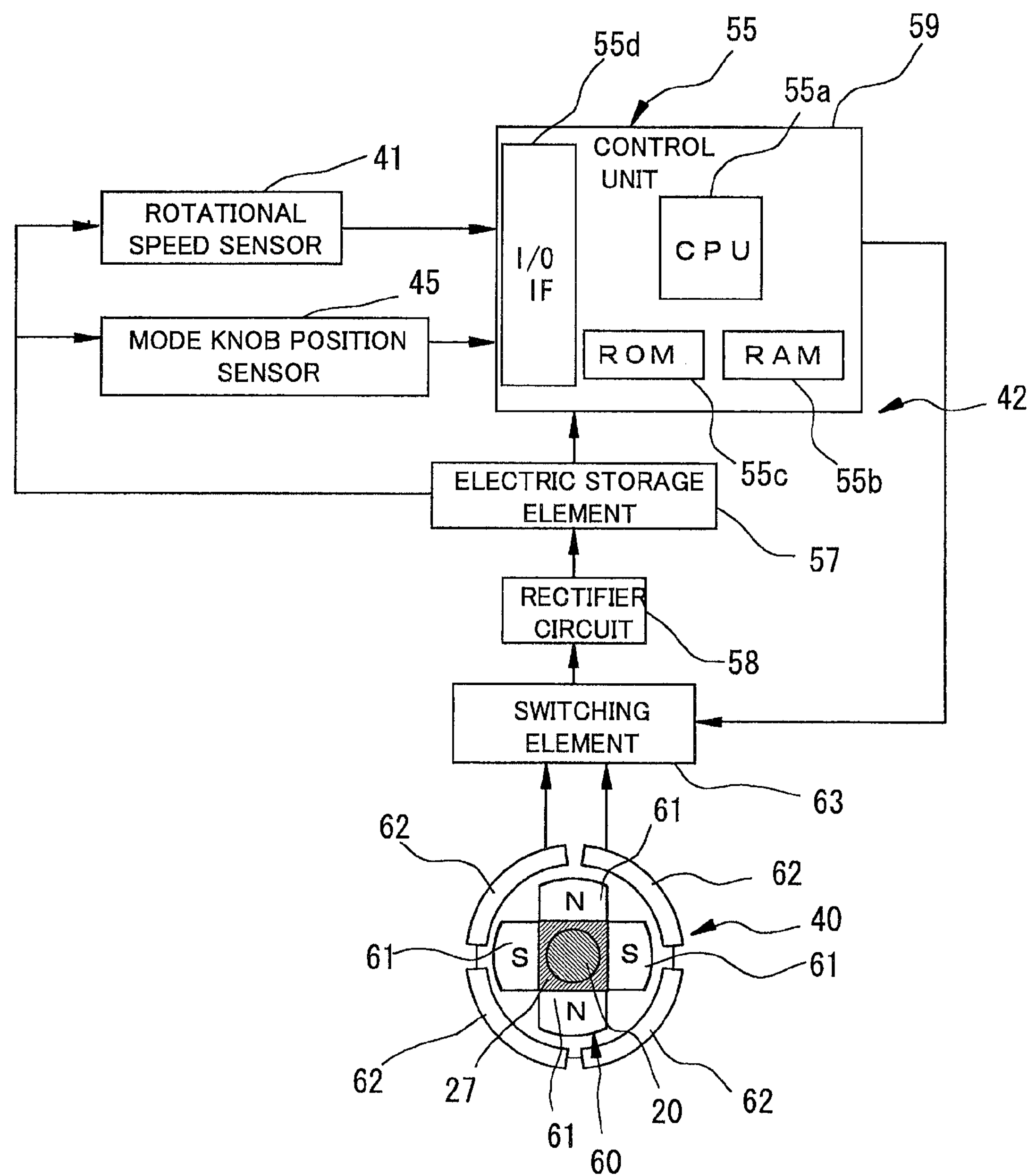
FIG. 5 is a configuration block diagram of the spool brake device.

As illustrated in FIG. 5, the spool control mechanism 25 includes a spool brake unit 40, a rotational speed sensor 41, a spool control unit 42, and a mode knob 43. The spool control unit 40 is disposed in both of the spool 12 and the reel unit 1. The rotational speed sensor 41 is configured to detect tension acting on the fishing line. The spool brake unit 42 is configured to electrically control the spool brake unit 40 with any one selected from the four brake modes. The mode knob 43 is used for selecting any one of the four brake modes.

The spool brake unit 40 is an electrically controllable unit configured to brake the spool 12 by electric generation. The spool brake unit 40 includes a rotor 60, a plurality of (e.g., four) coils 62, and a switching element 63. The rotor 60 includes a plurality of (e.g., four) magnets 61. The magnets 61 are aligned along the rotational direction of the spool shaft 20. The coils 62 are series-connected and opposed to each other on the outer peripheral side of the rotor 61. The switching element 63 is connected to the both ends of the plural series-connected coils 62. The spool brake unit 40 is configured to brake the spool 12 by changing a duty cycle. The duty cycle is changed by causing the switching element 63 to turn on/off electric current generated by relative rotation of the magnets 61 and the coils 62. Braking force generated in the spool brake unit 40 gets stronger in proportion to a period of on-time of the switching element 63 (i.e., in proportion to magnitude of a duty cycle).

The four magnets 61 of the rotor 60 are aligned in the circumferential direction of the rotor 60. Polarities of adjacent magnets 61 are different from each other. The length of each magnet 61 is roughly the same as that of the magnet holding portion 27. The inner surface of each magnet 61 is flat, while the outer surface thereof has a circular-arc cross-section. Each magnet 61 is disposed while the inner surface thereof makes contact with the outer peripheral surface of the magnet holding portion 27 of the spool shaft 20.

As illustrated in FIG. 2, a sleeve 68 is attached to the inner peripheral surface of the bobbin trunk 12*b* while being opposed to the magnets 61. For example, the sleeve 68 is a magnetic member formed by performing electroless nickel plating with respect to the surface of iron material such as SUM (extrusion and cutting). The sleeve 68 is fixed to the inner peripheral surface of the bobbin trunk 12*b* by an arbitrary fixation method (e.g., press-fitting, bonding, etc.). When thus structured magnetic sleeve 68 is opposed to the magnets 61, the magnetic flux from the magnets 61 concentrates in and passes through the coils 62. Accordingly, electric generation efficiency and brake efficiency are enhanced.

Coreless coils are employed as the coils 62 for preventing cogging and thereby smoothly rotating the spool 12. Further, the coils 62 are not provided with a yoke. Wires of the coils 62 are respectively wound in a roughly rectangular shape. The wound wires are opposed to the magnets 61 while being disposed within the magnetic field of the magnets 61. The four coils 62 are series-connected while the both ends thereof are connected to the switching element 63. The coils 62 are disposed substantially concentrically to the spool axis while being respectively curved in a circular-arc shape along the rotational direction of the spool 12. Accordingly, a roughly constant distance is produced between the coils 62 and the outer surfaces of the magnets 61. In other words, a clearance can be kept constant between the coils 62 and the magnets 61 in a rotary motion. The coils 62 are also mounted to a circuit board 70 to be described. As illustrated in FIG. 5, the switching element 63 includes, for instance, two FETs (Field-Effect Transistors). The FETs are parallel-connected and configured to execute a high-speed on/off control. The series-connected coils 62 are respectively connected to the drain terminals of the FETs. The switching element 63 is also mounted on the circuit board 70.

For example, a photoelectric switch is used for the rotational speed sensor 41. The photoelectric switch is of a light emission/reception type and includes a light emitter and a light receiver. The spool 12 has a detection tubular portion 12*c* integrally formed with the flange 12*a* opposed to the circuit board 70. The detection tubular portion 12*c* has a plurality of slits disposed at predetermined intervals in the rotational direction. The rotational speed sensor 41 is configured to detect the rotational speed of the spool 12 by light passing through the slits, while the light emitter and the light receiver are opposed through the detection tubular portion 12*c*.

The mode knob 43 is provided for selecting any one of four brake modes. Specifically, the brake modes are L-mode (long distance mode), M-mode (medium distance mode), A-mode (all-round mode) and W-mode (wind mode). First braking forces for the four modes are different from each other. Likewise, second braking forces for the four modes are different from each other.

Now, the L-mode is a long distance mode used for performing super-long-distance surf-casting in a preferable downwind condition using the fishing line with low relative density and a heavy terminal tackle (lure) with less air resistance (e.g., a spoon lure, a metal jig, a vibration lure, etc.). The L-mode is a brake mode configured to prolong flying distance of the terminal tackle by maximally using energy immediately after casting, maximally increasing the maximum rotational speed of the spool 12, and making the spool 12 almost freely rotate in the middle and subsequent stages of the casting. The first braking force of the L-mode is set to be the smallest among the first braking forces of the four brake modes.

The M-mode is a brake mode set for comfortably performing long-distance surface-casting using a terminal tackle (plug) with less air resistance (e.g., movable-centroid type plug, a pencil bait, a vibration plug, etc.). The M-mode is set for prolonging the flying distance of the terminal tackle while overrun is inhibited immediately after casting and backlash is narrowly prevented by appropriately correcting rotation of the spool 12 in the middle and subsequent stages of the casting. It is preferable to select the M-mode as the default mode in using the polyamide resin fishing line with low relative density.

The A-mode is a brake mode set for maximally using energy immediately after casting with an emphasis on prolongation of the flying distance of the terminal tackle in the later stage of casting. The A-mode is usable in almost all conditions regardless of a sort of fishing line, a sort of terminal tackle, and a wind direction. Especially, it is preferable to set the A-mode as the default mode in using the fluorocarbon fishing line with high relative density.

The W-mode is a brake mode set for prolonging the flying distance of the terminal tackle by inhibiting backlash as much as possible even under a condition that the flying distance of the terminal tackle is reduced against completely headwind. The second braking force of the W-mode is set to be the largest among the second braking forces of the four brake modes. The W-mode is set to be optimal for casting against headwind with a predetermined type of tackle that easily rotates and slows down in flying (e.g., a fixed-centroid type Minnow lure, a flatside crankbait, etc.). Further, the W-mode is set for reliably preventing backlash even when the spool 12 is rotated at a low speed even in short-distance casting (e.g., pitching casting, skipping casting, etc.).

As illustrated in FIG. 4, the mode knob 43 is rotatably mounted to the first side cover 6. The mode knob 43 can be positioned in any one of four rotation phases corresponding to the aforementioned four brake modes. The mode knob 43 is provided with a magnet (not illustrated in the figures). As illustrated in FIG. 5, the circuit board 70 is provided with a mode knob position sensor 45. The mode knob position sensor 45 is formed by two hall elements disposed at a predetermined interval in a circulation area of the magnet. The mode knob position sensor 45 detects the rotation phase of the mode knob based on an on/off switching of the two hall elements caused by passage of the magnet. Specifically, the switching states of the hall elements include "a both-on state", "a one-on and the other-off state", "a one-off and the other-on state" and "a both-off state". A control unit 55 to be described sets any of the four brake modes in accordance with the rotation phase.

As illustrated in FIG. 4, the mode knob 43 includes a knob part 43*a*, a knob body 43*b*, a magnet attached base 43*c*, a wall portion (not illustrated in the figure), a sound producing disc 43*e*, and a sound producing member 43*f*. The knob part 43*a* is a dial to be operated and rotated for selecting one of the four brake modes. The knob body 43*b* supports the knob part 43*a* in a rotatable state. The magnet attached base 43*c* is a member for attaching thereto the magnet (not illustrated in the figure) and is fixed to the tip of the knob part 43*a*. The wall portion is a step formed on the rear surface of the knob body 43*b*. The magnet attached base 43*c*, which is configured to pivot in conjunction with rotation of the knob part 43*a*, is restricted from pivoting when a lateral end thereof makes contact with the wall portion. The sound producing disc 43*e* is a disc-shaped member having four recesses. The sound producing disc 43*e* is disposed on the opposite side of the knob part 43*a* through the knob body 43*b*. The sound producing member 43*f* is formed by a spring member and a pin member configured to produce sound in contact with the recesses of the sound producing disc 43*e*.

The spool brake unit 42 includes the circuit board 70 and the control unit 55. The circuit board 70 is attached to a surface of the support member 81, which is opposed to the flange 12*a* of the spool 12. The control unit 55 is mounted on the circuit board 70.

The circuit board 70 is a ring-shaped washer board having a circular opening in the center thereof. The circuit board 70 is disposed on the outer peripheral side of the bearing accommodating part 14 while being substantially concentric to the spool shaft 20. The circuit board 70 is mounted to the support member 81 while being rotatable relatively thereto. Further, the circuit board 70 is positioned in a predetermined phase with respect to the opening 8*a*. Accordingly, the circuit board 70 is disposed in a constant phase even when the support member 81 is attached/detached to/from the annular member 13 fixed to the opening 8*a* by its rotation.

The circuit board 70 is herein mounted to the surface of the support member 81, which is opposed to the flange 12*a* of the spool 12. Therefore, it is possible to directly attach the coils 62 to the circuit board 70 while the coils 62 are disposed about the rotor 60. Accordingly, lead wires are not required for connecting the coils 62 and the circuit board 70. As a result, it is possible to reduce chances of insulation failure between the coils 62 and the circuit board 70. Furthermore, the coils 62 are mounted to the circuit board 70 attached to the support member 81. Therefore, only by attaching the circuit board 70 to the support member 81, the coils 62 can be also mounted to the support member 81. Accordingly, the spool control mechanism 25 can be easily assembled. Further, the circuit board 70 is mounted to the spool shaft portion while being rotatable relatively thereto. The circuit board 70 is also positioned in a predetermined phase with respect to the opening 8*a*. Therefore, the phases of the circuit board 70 and the reel unit 1 are not changed. Accordingly, even when the mode knob 43, mounted to the openable/closable first side cover 6, is provided with a magnet and a hall element is mounted on the circuit board 70, the hall element can constantly detect the magnet in the same positional relation.

The control unit 55 is formed by, for instance, a microcomputer including a CPU 55a, a RAM 55b, a ROM 55c, an I/O interface 55d, and etc. The ROM 55c of the control unit 55 stores a control program and a variety of data (e.g., basic braking force, correction braking force, timer value) to be used in two types of brake processing. The data are herein associated with the four control modes, respectively. Further, the ROM 55c stores values such as set values for tension (reference tension, start tension, etc.) in each control mode. The rotational speed sensor 41 and the mode knob position sensor 45 for detecting the rotational position of the mode knob 43 are connected to the control unit 55. Further, gates of the respective FETs of the switching element 63 are connected to the control unit 55. The control unit 55 is configured to execute an on/off control of the switching element 63 of the spool brake unit 40, for instance, using a PWM (Pulse Width Modulated) signal with a cycle of 1/1000 seconds based on inputs from the rotational speed sensor 41 and a knob position detecting sensor 56 and a control program. Specifically, the control unit 55 is configured to execute the on/off control of the switching element 63 with a duty cycle D in a selected brake mode. The duty cycle D is herein reduced in accordance with rotational speed. Electric power is supplied to the control unit 55 from an electric storage element 57 as a power source. Electric power is also supplied therefrom to the rotational speed sensor 41 and the knob position detecting sensor 56.

The electric storage element 57 as a power source uses an electrolytic capacitor, for instance, and is connected to a rectifier circuit 58. The rectifier circuit 58 is connected to the switching element 63. The rectifier circuit 58 is configured to transform alternating current from the spool brake unit 40, which includes the rotor 60 and the coils 62 and functions as a power generator, into direct current and stabilize voltage of the electric current. Under the condition, the rectifier circuit 58 is configured to supply the electric current to the electric storage element 57.

It should be noted that the rectifier circuit 58 and the electric storage element 57 are also mounted on the circuit board 70. Elements (e.g., the coils 62) mounted on the circuit board 70 are covered with an insulator film. The insulator film is made of synthetic resin insulator formed by hot melting molding. The insulator film has a brimmed cylindrical shape and covers the coils 62, the circuit board 70 and electric components mounted to the circuit board 70. It should be noted that the light emitter and the light receiver of the rotational speed sensor 41 are exposed from the insulator film.

Components of the dual-bearing reel, which is required for detachably attaching the aforementioned spool control mechanism 25 to the reel unit 1, will be hereinafter explained.

As illustrated in FIGS. 3 and 4, the dual-bearing reel, which is embedded with the spool control mechanism 25, further includes the support member 81, a board assembly 80, a retainer member 83, the annular member 13, and a board fixing plate 82. The support member 81 has a tubular portion 81 and a rotation support portion 81b. The tubular portion 81a is attached to the inner peripheral part of the annular member 13 fixed to the opening 8a of the first side plate 8. The rotation support portion 81b is disposed inside the tubular portion 81a for supporting an end of the spool shaft 20. The board assembly 80 is attached to the inside of the tubular portion 81a while being rotatable relatively thereto. The board assembly 80 is a unit integrally formed by the circuit board 70, electric components mounted on the circuit board 70, the coils 62, insertion members 84, and the insulator film. The retainer member 83 is formed by a C-ring. The retainer member 83 axially retains the board assembly 80 with respect to the support member 81 while being attached between the inner side of the tubular portion 81a and the outer side of the board assembly 80. The annular member 13 is attached to the inner peripheral part of the opening 8a of the first side plate 8 while being axially immovable. The board fixing plate 82 is an anti-rotation member for preventing the board assembly 80 from rotating with respect to the annular member 13. To hide a printed face of the board assembly 80, a sheet member is attached to a surface of the board assembly 80, which is opposed to the support member 81, although not illustrated in the figures.

As illustrated in FIGS. 3 and 4, the support member 81 has the tubular portion 81a and the rotation support portion 81b. The tubular portion 81a is attached to the inner peripheral part of the annular member 13 fixed to the opening 8a of the first side plate 8. The rotation support portion 81b supports the end of the spool shaft 20 while being disposed inside the tubular portion 81a. The tubular portion 81a has a grooved portion 81d on the inner peripheral part thereof. The grooved portion 81d is annularly formed along the circumferential direction of the tubular portion 81a. The retainer member 83, which is formed by the C-ring attached to the outer peripheral part of the board assembly 80, is attached to the grooved portion 81d while being press-contacted thereto. The retainer member 83, which is formed by the C-ring, is herein attached to the outer peripheral part of the board assembly 80 and the grooved portion 81d while being press-contacted to the grooved portion 81d. Therefore, the board assembly 80 is restricted from axially moving from the support member 81, while being rotatable relatively to the support member 81. As illustrated in FIG. 3, the support member 81 further has two through holes 81c formed through the bottom part of the rotation support portion 81b. Two fixation members 97 are attached to the two through holes 81c from the first side plate 8 side. The fixation members 97 are further screwed into two female threaded portions 6a formed in the first side cover 6. The support member 81 is thus fixed to the first side cover 6.

As illustrated in FIGS. 3 and 4, the board fixing plate 82 is a plate-shaped member fixed to the board assembly 80 while the coils 62 are inserted therethrough. The board fixing plate 82 has three through holes 82a formed on a plate face at predetermined intervals. Three fixation members 85, formed by three bolts, are screwed into the insertion members 84 of the board assembly 80 through the three through holes 82a. Accordingly, the board fixing plate 82 is fixed to the board assembly 80 while being immovable relatively thereto. The board fixing plate 82 has a contour larger than that of the board assembly 80. When being attached to the support member 81, the board assembly 80 is prevented from coming off oppositely to the support member 81 by the board fixing plate 82 having a large contour.

Operation and Action of Reel in Actual Fishing

In casting, the clutch mechanism 21 is switched into the clutch-off state by downwardly pressing the clutch lever 17. In the clutch-off state, the spool 12 is freely rotatable, and in casting, the fishing line is released from the spool 12 at a high momentum due to the weight of the terminal tackle. When the spool 12 is rotated in casting, the magnets 61 are rotated on the inner peripheral side of the coils 62. When the switching element 63 is then turned on, the coils 62 are electrified and the spool 12 is thereby braked. In casting, the rotational speed of the spool 12 is gradually increased and is then gradually reduced after reaching the peak thereof.

When the terminal tackle lands on water, the handle 2 is rotated in the fishing-line winding direction and the clutch mechanism 21 is thereby switched into the clutch-on state by the clutch return mechanism (not illustrated in the figures).

Under the condition, an angler waits for a fish to be hooked by the terminal tackle while palming the reel unit 1.

Thus structured dual-bearing reel includes the first rotary restricting unit 101 configured to restrict the annular member 13 from rotating in the engagement direction and the second rotary restricting unit 102 configured to restrict the annular member 13 from rotating in the disengagement direction under the condition that the first rotary restricting unit 101 restricts the annular member 13 from rotating in the engagement direction. Thus, the second rotary restricting unit 102 herein restricts the annular member 13 from rotating in the disengagement direction, while the first rotary restricting unit 101 restricts the annular member 13 from rotating in the engagement direction. Therefore, the annular member 13 can be prevented from being rotated in the disengagement direction by an angler's erroneous operation and can be also prevented from spontaneously rotating in the disengagement direction. Consequently, the annular member 13 can be prevented from unexpectedly coming off from the first side plate 8.

Other Exemplary Embodiments (a) In the aforementioned exemplary embodiment, the low-profile bait-casting dual-bearing reel has been exemplified for explaining the present invention. However, the present invention can be applied to round dual-bearing reels.

(b) In the aforementioned exemplary embodiment, the spool brake unit configured to brake the spool by power generation has been described. However, the spool brake unit is not limited to an electrically controllable unit, and can be a centrifugal type spool brake unit or a magnet type spool brake unit.

Figure 11:
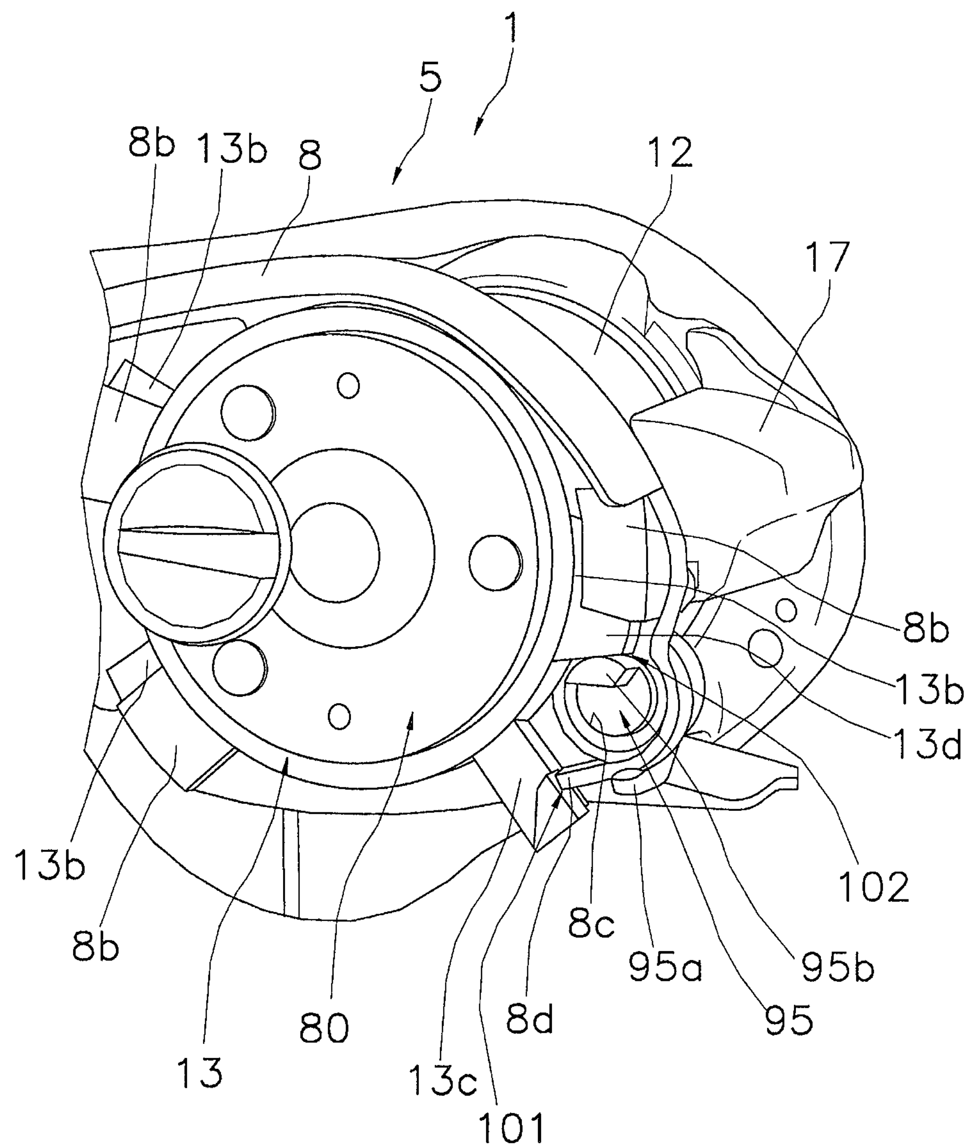
FIG. 11 is an enlarged perspective view of the dual-bearing reel where rotation of the annular member is restricted by a downward pivot operation of the lever member in another exemplary embodiment.
Figure 12:
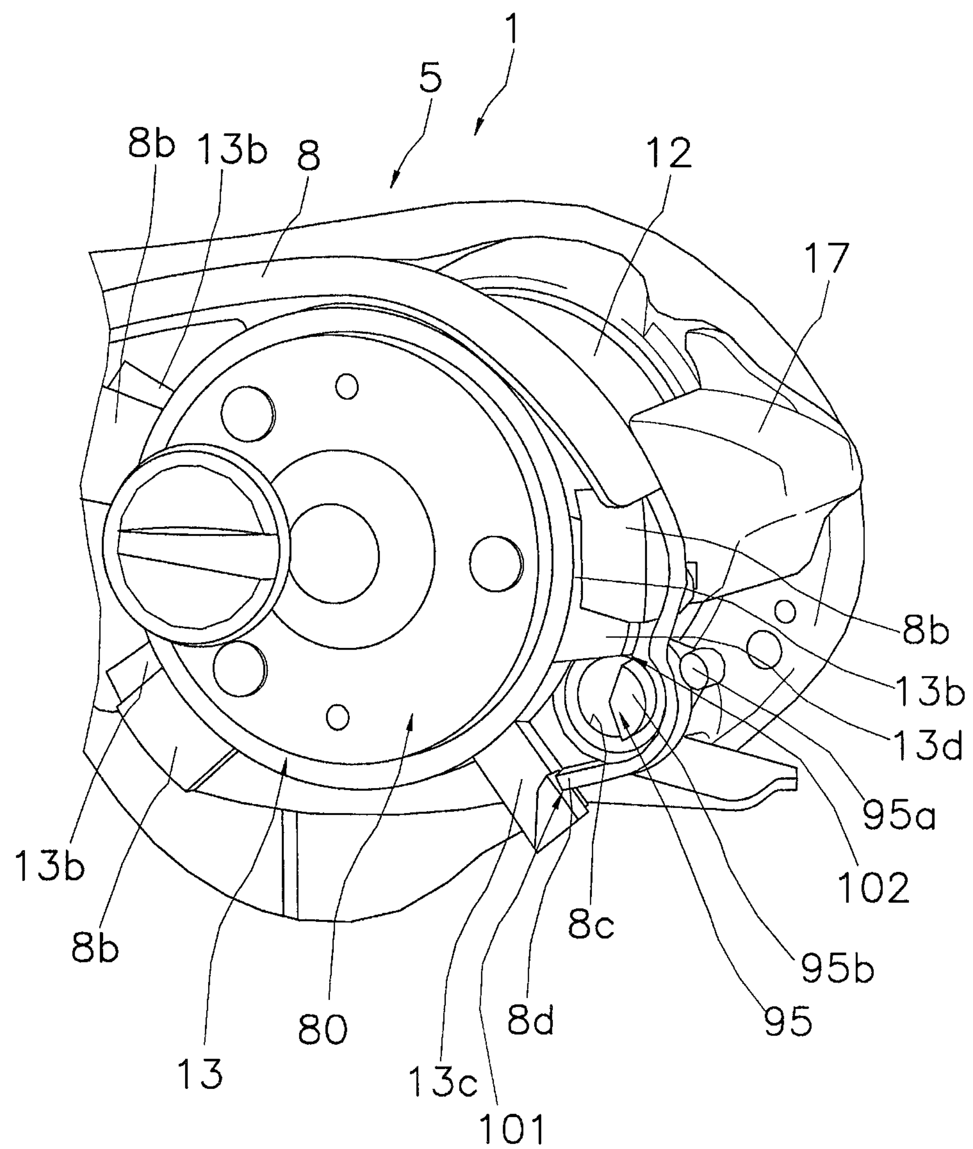
FIG. 12 is an enlarged perspective view of the dual-bearing reel where rotational of the annular member is free from restriction by an upward pivot operation of the lever member in another exemplary embodiment.

(c) In the aforementioned exemplary embodiment, the engagement direction of the annular member 13 is the same as the restriction direction of the lever member 95. However, as illustrated in FIGS. 11 and 12, the engagement direction of the annular member 13 can be set to be opposite to the restriction direction of the lever member 95. In other words, the engagement direction of the annular member 13 (i.e., the counterclockwise direction seen from the first side cover 6) and the restriction direction of the lever member 95 (i.e., the downward direction, which is the clockwise direction seen from the first side cover 6) can be opposite to each other.

(d) In the aforementioned exemplary embodiment, the annular member 13 is provided separately from the support member 81. However, a rotary member can be formed by integrating the annular member 13 and the support member 81. Alternatively, a rotary member can be formed by integrally forming the support member 81 on the first side cover 6.

Advantageous Effects Of Invention

According to the present invention, the dual-bearing reel includes the first rotary restricting unit configured to restrict rotation of the rotary member in the engagement direction and the second rotary restricting unit configured to restrict rotation of the rotary member in the disengagement direction while the first rotary restricting unit restricts rotation of the rotary member in the engagement direction. Therefore, the rotary member can be prevented from unexpectedly coming off from the first side plate.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel for winding a fishing line, the dual-bearing reel for being attached to a fishing rod, the dual-bearing reel comprising:

a reel unit including a first side plate being disposed on a first side and a second side plate being disposed on a second side opposition to the first side , the first side plate including an opening formed in a lateral part thereof, and an engaged portion;

a spool being configured to wind the fishing line, the spool being inserted into a space between the first side plate and the second side plate through the opening, the spool being rotatable with respect to the first side plate and the second side plate;

a handle being configured to rotate the spool, the handle disposed on the second side;

a rotary member including an engaging portion, the rotary member being configured to be attachable to the first side plate when being rotated in an engagement direction for causing the engaging portion to be engaged to with the engaged portion, the rotary member being configured to be detachable from the first side plate when being rotated in an disengagement direction opposite to the engagement direction for causing the engaging portion to be disengaged from the engaged portion of, the engaging portion protruding from an outer peripheral part of the rotary member, the engaged portion provided on a surrounding of the opening of the first side plate and protruding from the surrounding to an inner peripheral side;

a first rotary restricting unit configured to restrict rotation of the rotary member in the engagement direction; and a second rotary restricting unit configured to restrict rotation of the rotary member in the disengagement direction while the first rotary restriction unit restricts rotation of the rotary member in the engagement direction.

2. The dual-bearing reel according to claim 1, wherein, the engaged portion is a plate-shaped member formed by outwardly protruding a part of the surrounding of the opening and extending an end surface of the protruding portion to the inner peripheral side, and the engaging portion is a protrusion to be inserted in a clearance between the engaged portion and the surrounding of the opening.

3. The dual-bearing reel according to claim 1, further comprising

A support member supporting a rotary shaft of the spool, the support member attached to the rotary member as an element provided separately from the support member, the support member being rotatable relatively with respect to the rotary member and axially immovable with respect to the rotary member.

4. The dual-bearing reel according to claim 1, further comprising a support member supporting the rotary shaft of the spool, the support member provided integrally with the rotary member.

5. A dual-bearing reel for winding a fishing line, the dual-bearing reel for being attached to a fishing rod, the dual-bearing reel comprising:

a reel unit including a first side plate being disposed on a first side and a second side plate being disposed on a second side opposition to the first side, the first side plate including an opening formed in a lateral part thereof, and an engaged portion;

a spool being configured to wind the fishing line, the spool being inserted into a space between the first side plate and the second side plate through the opening, the spool being rotatable with respect to the first side plate and the second side plate;

a handle being configured to rotate the spool, the handle disposed on the second side;

a rotary member including an engaging portion, the rotary member being configured to be attachable to the first side plate when being rotated in an engagement direction for causing the engaging portion to be engaged to with the engaged portion, the rotary member being configured to be detachable from the first side plate when being rotated in an disengagement direction opposite to the engagement direction for causing the engaging portion to be disengaged from the engaged portion of, the engaging portion protruding from an outer peripheral part of the rotary member, the engaged portion provided on a surrounding of the opening of the first side plate and protruding from the surrounding to an inner peripheral side;

a first rotary restricting unit configured to restrict rotation of the rotary member in the engagement direction, and including a first protruding portion and a second protruding portion, the first protruding portion being formed by outwardly protruding a part of the surrounding of the opening, the second protruding portion protruding from the outer peripheral part of the rotary member, and being configured to make contact with the first protruding portion for restricting rotation of the rotary member in the engagement direction when the rotary member is rotated in the engagement direction; and a second rotary restricting unit configured to restrict rotation of the rotary member in the disengagement direction while the first rotary restriction unit restricts rotation of the rotary member in the engagement direction.

6. A dual-bearing reel for winding a fishing tine, the dual-bearing reel for being attached to a fishing rod, the dual-bearing reel comprising:

a reel unit including a first side plate being disposed on a first side and a second side plate being disposed on a second side opposition to the first side, the first side plate including an opening formed in a lateral part thereof, and an engaged portion;

a spool being configured to wind the fishing line, the spool being inserted into a space between the first side plate and the second side plate through the opening, the spool being rotatable with respect to the first side plate and the second side plate;

a handle being configured to rotate the spool, the handle disposed on the second side;

a rotary member including an engaging portion, the rotary member being configured to be attachable to the first side plate when being rotated in an engagement direction for causing the engaging portion to be engaged to with the engaged portion, the rotary member being configured to be detachable from the first side plate when being rotated in an disengagement direction opposite to the engagement direction for causing the engaging portion to be disengaged from the engaged portion of, the engaging portion protruding from an outer peripheral part of the rotary member, the engaged portion provided on a surrounding of the opening of the first side plate and protruding from the surrounding to an inner peripheral side;

a first rotary restricting unit configured to restrict rotation of the rotary member in the engagement direction; and a second rotary restricting unit configured to restrict rotation of the rotary member in the disengagement direction while the first rotary restriction unit restricts rotation of the rotary member in the engagement direction the second rotary restricting unit includes a third protruding portion and a fourth protruding portion, the fourth protruding portion outwardly protruding from the surrounding of the opening, the third protruding portion protruding from the outer peripheral part of the rotary member, the third protruding portion being configured to make contact with the fourth protruding portion for restricting rotation of the rotary member in the disengagement direction when the rotary member is rotated in the disengagement direction.

7. The dual-bearing reel according to claim 6, further comprising a lever member attached to the surrounding of the opening of the first side plate, wherein the lever member is pivotable about an axis arranged parallel to a rotary shaft of the spool, the lever member includes an operating portion the fourth protruding portion is configured to be movable between a restriction position and a restriction released position in conjunction with a pivot operation of the operating portion, the fourth protruding portion is allowed to make contact with the third protruding portion when at the restriction position, the fourth protruding portion is prevented from making contact with the third protruding portion when at the restriction release position.

8. The dual-bearing reel according to claim 7, wherein the engagement direction of the rotary member is same as a restriction direction of the lever member.

9. The dual-bearing reel according to claim 7, wherein the engagement direction of the rotary member is opposite to a restriction direction of the lever member.

10. The dual-bearing reel according to one of claim 9, wherein the lever member is disposed on a spool-side lateral portion of a rear lower part of the first side plate.

* * * * *